(# 2,842,459

PRIMERS FOR VINYL RESIN COATING

Frank Gollub and Marvin S. Wool, University City, and William D. Berberich, St. Louis, Mo., assignors to Dennis Chemical Company, St. Louis, Mo., a corporation of Missouri No Drawing. Application August 1, 1955
Serial No. 525,796

9 Claims. (Cl. 117—72)

This invention relates to primers and more particularly to primers useful for bonding vinyl resin coatings to a wide variety of materials.

Briefly, this invention is directed to a primer for vinyl resin dispersions comprising a mixture of methyl methacrylate and epoxy resins dissolved in an organic solvent, the ratio of the methacrylate resin to epoxy resin being between approximately 15:85 and 99:1. Also, this invention includes the method of bonding a vinyl resin coating to a surface comprising applying this primer to said surface, volatilizing said solvent, applying a vinyl resin dispersion to the primed surface and thereafter heating the dispersion.

Among the several objects of this invention may be noted the provision of a primer which will effectively bond a coating of vinyl resin to metal and glass surfaces; the provision of a primer of the class described which bonds a vinyl resin coating to surfaces with sufficient adherence to withstand subsequent forming and stamping operations; the provision of such a primer which may be applied in a single operation to a surface to be coated with a vinyl resin dispersion; the provision of a primer which is resistant to electroplating bath chemicals; the provision of a primer of the class described which resists aging due to migration of the plasticizer from the fused vinyl resin dispersion into the primer; the provision of a process for bonding a vinyl resin coating to a surface in which the curing conditions are not critical; the provision of such a process which makes possible the application of an increased coating thickness; the provision of a process in which vinyl resin dispersions having high solids content can be employed to form vinyl resin coatings on metal; and, a process of the class described in which the resulting vinyl resin coating does not have to be mechanically buffed to obtain a high gloss. Other objects and features will be in part apparent and in part pointed out hereinafter.

The invention accordingly comprises the products and methods hereinafter described, the scope of the invention being indicated in the following claims.

One of the more important advances in the vinyl resin field has been the development of vinyl resin dispersions or suspensions. These materials include both plastisols (paste dispersion of vinyl resin elastomers in a plasticizer) and organosols (paste dispersion of these elastomers in a plasticizer and volatile liquid). These dispersions have a wide variety of uses, especially in the coating of various articles. However, it has heretofore been difficult to successfully adhere these materials to metal surfaces. It has been possible to gain adherence by using low plasticizer content organosol dispersions with special additives and applying the organosol after first treating the surface with a vinyl butyral wash primer. Such a system has the disadvantage of limiting the vinyl resin coating material to low solids content organosols thereby reducing the thickness of the vinyl coating to about 2 mils; and requiring closely controlled oven curing conditions. Also, such organosols have decreased storage stability and the resulting coatings must be mechanically buffed to obtain gloss. Other known metal primers for plastisols and organosols additionally may possess one or more disadvantages such as being ineffective for use with all of the common metals; having insufficient adherence to permit forming and stamping operations subsequent to coating; requiring critical oven control dependent upon the characteristics and mass of the metal body being coated; a tendency to decreased adherency with aging due to migration of the plasticizer into the primer; and insufficient resistance to electroplating bath chemicals.

In accordance with the present invention it has been found that a primer highly useful for bonding vinyl resin coatings to a wide variety of surfaces, and which does not possess any of the disadvantages of the known materials, can be made by employing certain mixtures of methyl methacrylate and epoxy resins dissolved in an organic solvent. A single coat application of this novel primer to the surface of such materials as galvanized metal, aluminum, glass, magnesium, copper, brass and steel, makes it possible to bond effectively a vinyl resin coating to the surface. Both plastisol and organosol vinyl dispersions may be used and the solids content is not limited nor are the oven curing conditions critical. The primed surface is resistant to electroplating bath chemicals and the adhesion is of such a high order that the coated product can be easily formed and stamped. Also, softening due to migration of the vinyl dispersions into the primer is avoided and under the given curing temperature maximum adhesion is developed more quickly than with known primers.

The primers of this invention comprise a mixture of methyl methacrylate and epoxy resin in which the ratio of the former to the latter may vary between about 15:85 and 99:1, dissolved in an organic solvent. Resins which are commercially available under the trade designations Lucite 41 and Acryloid A–10 and A–101 are typical methyl methacrylate, or predominantly methyl methacrylate, polymers. Epoxy resins are commercially available under the trade designations Epon and Epi-Rez (e. g., Epon 562, 828, 864, 1001, 1007 and 1009; and Epi-Rez 520, 540 and 550).

The organic solvent used is preferably a mixture or blend of alkyl and aryl ketones, aromatic hydrocarbons and alcohols. Exemplary alkyl ketones are methylethyl, methylisobutyl and diisobutyl ketones and diacetone alcohol. Illustrative aromatic hydrocarbons are toluol and high flash naphtha. Alcohols include 2-methoxy ethanol or any of the alkyl Cellosolves. The organic solvent thus includes both latent and active components.

The proportion of resins to solvent may be varied to suit the way in which it will be applied, i. e., brushing, spraying, dipping, roll coating, etc. Also the ratio of methyl methacrylate to epoxy resin may be varied within the above specified limits, approximately equal parts by weight being preferred. Typical proportions of resin to resin and resins to solvent are shown in the examples stated hereinafter.

It is preferred that the primers of the present invention also include a curing agent for the epoxy resin. This curing agent promotes the cross linking of the epoxy resin and decreases the time required for adhesion during heat curing of the vinyl dispersion coatings. Also, the inclusion of a curing agent generally enhances the properties and versatility of the primer. Typical curing agents include poly-functional amines and acid anhydrides. For example, poly-functional amines (such as diethylene triamine, triethylene tetramine, tetraethylene pentamine and phenylenediamine-meta) and acid anhydrides (such as maleic, dichloromaleic and phthalic anhydrides) are useful.

Any of the conventional vinyl plastisols and organosols, using either the single polymer or the copolymer types of vinyl resins may be utilized in the process of the present invention. The polyvinyl chloride resins are most desirable. Exemplary vinyl resins are those sold under the trade designations Geon 121, Opalon 410 and Vinylite QYNV. The resin dispersions may also contain pigments and fillers as well as additional plasticizers and stabilizers without detracting from the effectiveness of the primers of this invention.

The following examples illustrate the invention.

*Example 1*

A primer possessing characteristics especially useful for brush or dip application was formulated by intermixing:

|  | Percent |
|---|---|
| Methyl methacrylate polymer (Acryloid A-101-solids) | 7.40 |
| Epoxy resin (Epon 1007) | 7.40 |
| Methyl ethyl ketone | 11.10 |
| Methyl isobutyl ketone | 23.10 |
| Diisobutyl ketone | 3.90 |
| Toluol | 23.10 |
| Methyl Cellosolve | 24.00 |

*Example 2*

A primer possessing characteristics especially useful for brush or dip application was formulated by intermixing:

|  | Percent |
|---|---|
| Methyl methacrylate polymer (Acryloid A-101-solids) | 7.38 |
| Epoxy resin (Epon 1007) | 7.38 |
| Methyl ethyl ketone | 11.07 |
| Methyl isobutyl ketone | 23.03 |
| Diisobutyl ketone | 3.89 |
| Toluol | 23.03 |
| Methyl Cellosolve | 23.92 |
| Diethylene triamine | 0.30 |

*Example 3*

A primer possessing characteristics particularly suitable for roll coating application was formulated by intermixing:

|  | Percent |
|---|---|
| Methyl methacrylate polymer (Lucite 41) | 6.35 |
| Epoxy resin (Epon 1007) | 6.35 |
| Methylethyl ketone | 31.75 |
| Diacetone alcohol | 23.80 |
| High flash naphtha | 31.75 |

*Example 4*

A primer possessing characteristics particularly suitable for roll coating application was formulated by intermixing:

|  | Percent |
|---|---|
| Methyl methacrylate polymer (Lucite 41) | 6.34 |
| Epoxy resin (Epon 1007) | 6.34 |
| Methylethyl ketone | 31.69 |
| Diacetone alcohol | 23.74 |
| High flash naphtha | 31.69 |
| Diethylene triamine | 0.20 |

*Example 5*

The primer of Example 1 was applied to steel bars ⅛" thick by dipping. The dipped bars were baked for 8 minutes at 350° F. in a hot air oven and then dip coated in the following plastisol:

|  | Lbs. |
|---|---|
| Polyvinyl chloride resin (QYNV) | 100 |
| Diisooctyl phthalate | 80 |
| Dibutyl tin maleate | 1 |

The vinyl resin coating was cured for 8 minutes at 350° F. to form a fused coating. This fused vinyl resin coating adhered to the metal so effectively that the coating itself would tear before it would separate from the metal. The coated bars could be subjected to forming and stamping operations.

*Example 6*

The primer of Example 2 was applied to steel plates by brushing. The brushed plates were air dried for 4 hours and then coated with the following plastisol:

|  | Lbs. |
|---|---|
| Polyvinyl chloride resin (Geon 121) | 100 |
| Diisooctyl phthalate | 80 |
| Dibutyl tin maleate | 1 |

The vinyl resin coating was cured as in Example 5 and yielded a product similar to Example 5.

*Example 7*

The primer of Example 2 was applied to steel bars ⅛" thick by dipping. The dipped bars were baked for 2 minutes at 300° F. and then dip coated in the following plastisol:

|  | Lbs. |
|---|---|
| Polyvinyl chloride resin (Geon 121) | 100 |
| Diisooctyl phthalate | 80 |
| Dibutyl tin maleate | 1 |

The vinyl resin coating was cured as in Example 5 and yielded a product similar to Example 5.

*Example 8*

Smooth and sanded steel bars ⅛" thick were dipped in a series of primers, similar to that of Example 1, in which the ratio of methyl methacrylate to epoxy resins varied over wide limits. These primed bars were baked 8 minutes at 350° F. in a hot air oven and then dip coated with a representative vinyl plastisol. The dip coated product was then cured 8 minutes at 350° F. and tested as to the adherence of the vinyl resin coating to the metal. The adhesive strength of the resulting bonds is given in pounds per inch of width. The maximum measurable adhesion is about 32 lbs. per inch width as the vinyl resin itself tears at about this figure. The following table sets forth the results of these tests:

| Percent Methyl Methacrylate Resin | Percent Epoxy Resin | Adhesive Strength in lbs./inch of width | |
|---|---|---|---|
| | | Sanded Metal | Smooth |
| 0 | 100 | 0.0 | 0.0 |
| 16 | 84 | 11.4 | 13.3 |
| 28 | 72 | 18.3 | 22.7 |
| 37 | 63 | over 32.0 | 26.7 |
| 44 | 56 | over 32.0 | 31.7 |
| 50 | 50 | over 32.0 | over 32.0 |
| 57 | 43 | over 32.0 | over 32.0 |
| 67 | 33 | over 32.0 | 26.7 |
| 80 | 20 | over 32.0 | 17.3 |
| 99 | 1 | 11.4 | 7.5 |
| 100 | 0 | 0 | 0 |

*Example 9*

Example 8 was repeated except primers similar to those of Example 2 (i. e., including a curing agent) were used. The following table sets forth the results of these tests.

| Percent Methyl Methacrylate Resin | Percent Epoxy Resin | Adhesive Strength in lbs./inch of Width |
|---|---|---|
| 0 | 100 | 0.0 |
| 16 | 84 | 8.0 |
| 28 | 72 | 16.0 |
| 37 | 63 | over 32.0 |
| 44 | 56 | over 32.0 |
| 50 | 50 | over 32.0 |
| 57 | 43 | over 32.0 |
| 67 | 33 | over 32.0 |
| 80 | 20 | over 32.0 |
| 99 | 1 | |
| 100 | 0 | 0 |

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

We claim:

1. A primer for vinyl resin dispersions comprising a mixture of a methyl methacrylate polymer and an unesterified epoxy resin dissolved in an organic solvent, the ratio of the methacrylate polymer to epoxy resin being between approximately 15:85 and 99:1.

2. A primer for vinyl resin dispersions comprising a mixture of approximately equal parts of a methyl methacrylate polymer and an unesterified epoxy resin dissolved in an organic solvent.

3. A primer for vinyl resin dispersions comprising a mixture of a methyl methacrylate polymer and an unesterified epoxy resin dissolved in an organic solvent, and a curing agent for said epoxy resin, the ratio of the methacrylate polymer to epoxy resin being between approximately 15:85 and 99:1.

4. A primer as set forth in claim 3 in which the curing agent is selected from the group consisting of polyfunctional amines and acid anhydrides.

5. A primer as set forth in claim 3 in which the curing agent is a polyalkylene polyamine.

6. A primer as set forth in claim 3 in which the organic solvent is a mixture of alkyl ketones, aromatic hydrocarbons and alcohols.

7. A primer for vinyl resin dispersions comprising a mixture of approximately 8 parts by weight of a methyl methacrylate polymer and approximately 8 parts by weight of an unesterified epoxy resin, said polymer and resin being dissolved in an organic solvent including approximately 23 parts by weight of toluol, approximately 38 parts by weight of alkyl ketones and approximately 24 parts by weight of 2-methoxy ethanol, and about 0.3 part by weight of diethylene triamine.

8. The method of bonding a vinyl resin coating to a surface which comprises applying a primer to said surface, said primer comprising a mixture of a methyl methacrylate polymer and an unesterified epoxy resin dissolved in an organic solvent, the ratio of said methacrylate polymer to said epoxy resin being between approximately 15:85 and 99:1, volatilizing said solvent, applying a vinyl resin dispersion to the primed surface, and thereafter heating the dispersion.

9. The method of bonding a vinyl resin coating to a metal surface which comprises applying a primer to said surface, said primer comprising a mixture of a methyl methacrylate polymer and an unesterified epoxy resin dissolved in an organic solvent, and a curing agent for said epoxy resin, the ratio of said methacrylate polymer to said epoxy resin being between approximately 15:85 and 99:1, heating said primer to volatilize said solvent and cure said epoxy resin, applying a vinyl resin plastisol to the primed surface, and thereafter heating the plastisol to form a fused vinyl resin coating.

References Cited in the file of this patent

UNITED STATES PATENTS

| | | |
|---|---|---|
| 2,404,357 | Bechtold | July 23, 1946 |
| 2,637,716 | Ott | May 5, 1953 |
| 2,677,671 | Yuska | May 4, 1954 |
| 2,681,524 | Neugass | June 22, 1954 |

FOREIGN PATENTS

| | | |
|---|---|---|
| 606,937 | Great Britain | Aug. 23, 1948 |